INVENTORS
ROBERT S. CURRY JR.
THEODORE GOLD
REUBEN P. SNODGRASS
IVAR S. WESTERBACK
BY [signature]
ATTORNEY

IMAGE PRODUCING APPARATUS

Filed Jan. 8, 1962 5 Sheets-Sheet 2

INVENTORS
ROBERT S. CURRY JR.
THEODORE GOLD
REUBEN P. SNODGRASS
IVAR S. WESTERBACK
BY
ATTORNEY

Feb. 22, 1966 R. S. CURRY, JR., ETAL 3,237,193

IMAGE PRODUCING APPARATUS

Filed Jan. 8, 1962 5 Sheets-Sheet 3

INVENTORS
ROBERT S. CURRY JR.
THEODORE GOLD
REUBEN P. SNODGRASS
IVAR S. WESTERBACK
BY
ATTORNEY

Feb. 22, 1966 R. S. CURRY, JR., ETAL 3,237,193

IMAGE PRODUCING APPARATUS

Filed Jan. 8, 1962 5 Sheets-Sheet 4

INVENTORS
ROBERT S. CURRY JR.
THEODORE GOLD
REUBEN P. SNODGRASS
IVAR S. WESTERBACK
BY
ATTORNEY

Feb. 22, 1966 R. S. CURRY, JR., ETAL 3,237,193

IMAGE PRODUCING APPARATUS

Filed Jan. 8, 1962 5 Sheets-Sheet 5

INVENTORS
ROBERT S. CURRY JR.
THEODORE GOLD
REUBEN P. SNODGRASS
IVAR S. WESTERBACK
BY
ATTORNEY

United States Patent Office 3,237,193

Patented Feb. 22, 1966

3,237,193

IMAGE PRODUCING APPARATUS

Robert S. Curry, Jr., Baldwin, Theodore Gold, Ronkonkoma, Reuben P. Snodgrass, Lake Ronkonkoma, and Ivar S. Westerback, Glen Head, N.Y., assignors to Sperry Rand Corporation, Great Neck, N.Y., a corporation of Delaware Filed Jan. 8, 1962, Ser. No. 164,769
5 Claims. (Cl. 343—108)

Figure 1:
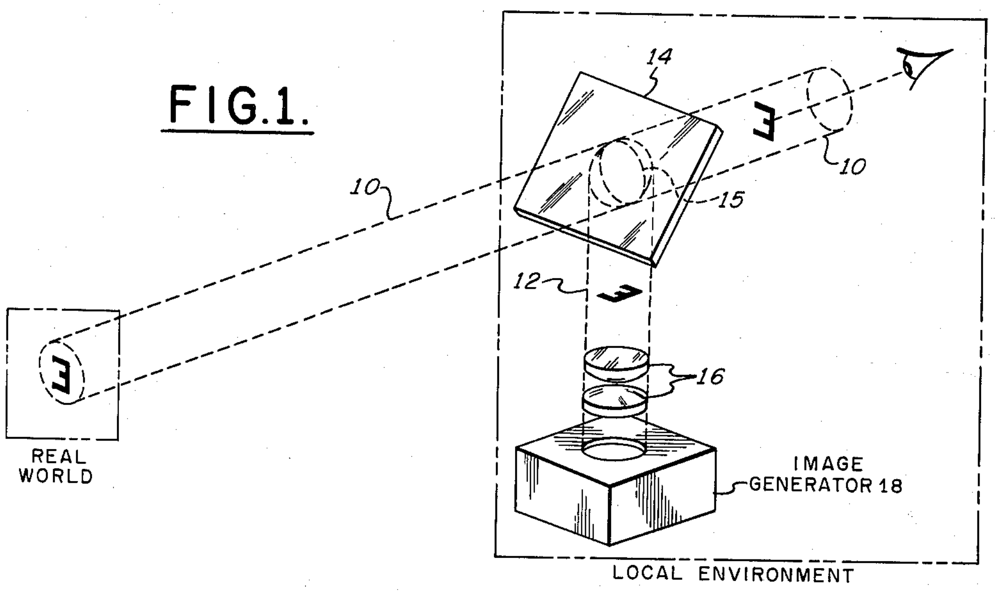

This invention relates in general to indicating apparatus for aiding the controller or operator of a controllable condition in this control of such controllable condition, the operator normally controlling the condition with respect to visual data that is external to his immediate environment and which data may or may not at all times be visible to him, but which external data is essential for him to control satisfactorily the condition. More particularly, the invention relates to sighting apparatus which provides the operator with locally generated visual cues representing the external reference data, the cues being so displayed in the normal field of vision of the operator that, could he actually see the real data, both it and the locally generated data cues would coincide; that is, the corresponding elements of each would be coincident or superimposed or overlayed one on the other.

As an example of an environment in which the invention is particularly well suited is that wherein the operator is the pilot of a controllable vehicle and the condition to be controlled is the maneuvering of the vehicle to approach and maintain a specific or predetermined path of travel ultimately terminating at a desired destination. Specifically, the vehicle can be an aircraft and the condition to be controlled can be the maneuvering of the aircraft to approach and maintain a landing path with the ultimate goal of landing the aircraft on a landing runway. In this latter example, the reference data can be the landing runway or other ground based object or objects which, depending upon weather conditions, time of day, etc., may be or may not at all times be visible to the pilot from his immediate environment which, in this case, is the inside of the aircraft cockpit. Thus, in accordance with the teachings of the present invention, locally generated cues representing the reference data, e.g. real world objects, are generated in the aircraft and displayed in the normal field of vision of the pilot in such a manner that they coincide in position, shape, and orientation with the real world objects they represent.

In many prior art flight instrument systems involving the projection of information in the pilot's field of vision, such information is usually merely that information which is already on the instrument panel and the projection is merely for the purpose of eliminating the necessity for the pilot to shift his eyes back and forth from the windshield to the panel. Other systems of this character attempt to display on the windshield a picture, which at best must be fanciful, of a desired flight path performance. The projected information, in either case, bears no relation whatsoever to actual, definite objects external of the aircraft cockpit, such as ground objects; nor do such systems in any way relate the position, flight path and attitude of the aircraft with respect to such object or objects, whether or not the object is visible to the pilot.

In a specific embodiment of the present invention, a reflex type sighting device is provided which may comprise a reflex mirror located in the normal field of view of the pilot or which alternatively may comprise the craft windshield itself through which the pilot may observe images of real world objects, such as, for example, ground objects including natural terrain features as well as man made objects. As stated above, a typical real world object employed herein for explanatory purposes constitutes an aircraft runway. In the present example, a locally generated image having the same general dimensions and shape as the actual runway image is transmitted to the pilot in such a way that it continuously and simultaneously visibly overlays or is superimposed on the actual image of the runway. As the actual runway image changes its position, size and shape, i.e. its aspect, due to changing position and attitude of the craft as the pilot maneuvers it during landing approach to the runway, so does the aspect of the locally generated image, thereby maintaining coincidence between or superposition of the images. The locally generated image or cue has its light rays collimated so that it appears to be positioned at optical infinity, this being where the actual runway optically appears to be during the greatest part of the landing approach maneuver, which by this means permits the simultaneous viewing of the cue image and the corresponding external object image.

The aircraft landing environment has been chosen for illustrating the principles of the present invention because it is one of the most critical phases in the control of an aircraft and it is in this environment in which the advantages of the invention are particularly evident. The approach and landing of an aircraft, especially under completely overcast, partly ovrecast, marginal visibility, and in night landing conditions is a difficult and sometimes dangerous maneuver. During zero or substantially zero visibility landing approach conditions the pilot has no idea at all where the runway actually lies with respect to his instantaneous position, except by estimation, using conventional radio aids and considerable experience. Also, when breaking through an overcast, the pilot may catch intermittent glimpses of the ground; but too often these glimpses are of such short duration that he does not have time to recognize ground objects, such as the runway, and thereby determine his position and attitude with respect thereto. Under marginal visibility conditions such as at dusk, in haze, and at night, the pilot, even though there is no overcast, may have difficulty in recognizing the runway or other ground objects to which he would normally refer under VFR conditions. For example, the runway may be lost in ground haze or at night he may have difficulty in positively distinguishing the airport and runway lights from other lights in the area.

With the indicating system of the present invention the landing approach made under any of the above conditions is greatly facilitated inasmuch as the pilot is provided with specific and meaningful real world cues or images injected into his field of vision in such a way that they always appear at precisely the same position and in precisely the same orientation as corresponding images from actual or real world objects. For example, in breaking through an overcase or in a partial overcast wherein, as mentioned above, the pilot may get intermittent glimpses of the actual runway; due to the fact that a locally created image of the runway is located in his field of vision at precisely the same position as the actual runway image, the pilot will know where the runway is.

Thus, the indicating system of the present invention performs two vital functions in aiding the pilot in his approach to a runway under all conditions but particularly under poor to marginal visibility conditions: (a) it provides the pilot with an indication of precisely where to look for the actual runway and his craft's relative orientation with respect to it, and (b) when he does get a glimpse of the actual runway and observes that the locally generated image coincides with it, he will tend to place more confidence in proceeding with the approach to a lower altitude before observing an unobstructed view of the runway.

Images of real world objects are locally generated and displayed to the pilot in such a manner that they correspond in position, size and orientation to that of actual images of these objects; therefore, whether or not the pilot can actually observe a real world object, he knows precisely where it is and, from its size and shape, generally where he is relative to it. In other words, the pilot may fly his aircraft with respect to a locally created real world image in precisely the same manner as he would if he could actually see the respective real world object of that image. This is the mode of flying with which the pilot is most familiar and therefore by continuous experience is the safer mode of flight.

In accordance with the teachings of the present invention, since the image of the real-world object, i.e. the aircraft runway image seen by the pilot, will change its position, shape, and orientation in accordance with the position and attitude (pitch, roll, elevation, etc.) so must the locally generated image correspondingly change its position, size and shape. This is accomplished in the present invention by means of data readily available in the aircraft. Specifically, such data may consist of the vertical and lateral distance of the aircraft with respect to an extension of the center line of the runway as defined by, for example, the localizer and glide slope beams of a radio instrument landing system; also, such position and attitude data may be provided by a vertical gyro, compass, altimeter, etc.

It is therefore the primary object of the present invention to provide sighting apparatus for the controllers of a controllable condition wherein locally generated visual data corresponding to data external to the controller's immediate environment and with reference to which the condition is to be controlled is made available to him in such a manner that the locally generated data appears at the same position and in the same orientation or aspect with respect to the controller's immediate environment that the external or reference data does when visible.

It is a further object of the present invention to provide a sighting apparatus for the operator of a controllable craft wherein locally generated images of certain real world objects are projected into the field of vision of the pilot and are controlled in position, size, shape, and orientation in the field of vision of the pilot in accordance with data representing the actual position of orientation of the craft with respect to said real world objects, such data being provided through position and attitude equipment carried in the craft.

Another object of the present invention is to provide flight indicating apparatus for aircraft in which locally generated images of real world objects are projected into the field of vision of the pilot, and wherein such locally generated images are controlled in position, size, and shape with movements of the aircraft relative to the actual real world objects so that the locally generated images and the images from respective real world objects are maintained in substantially coincident or superimposed relationships. It is still a further object of the present invention to provide a sighting apparatus of the character set forth above wherein the pilot may control his aircraft in accordance with locally generated visual cues corresponding to real world objects whether or not such real world objects are visible to the pilot.

Figure 2:
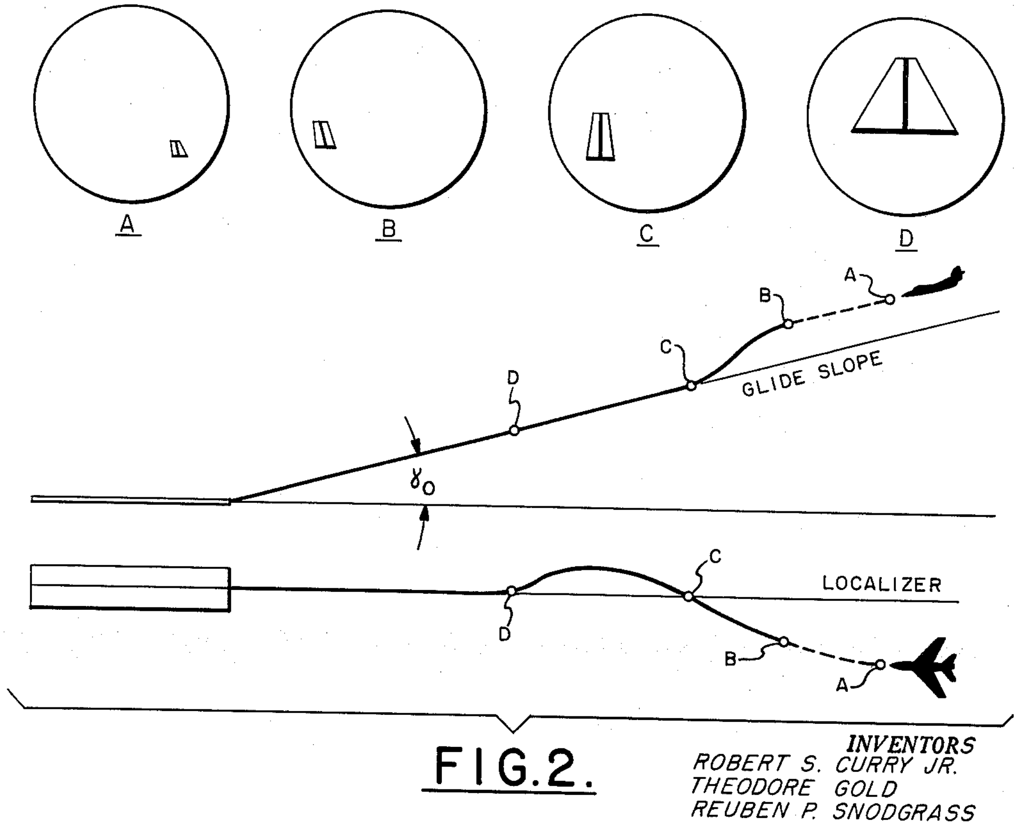
Figure 3:
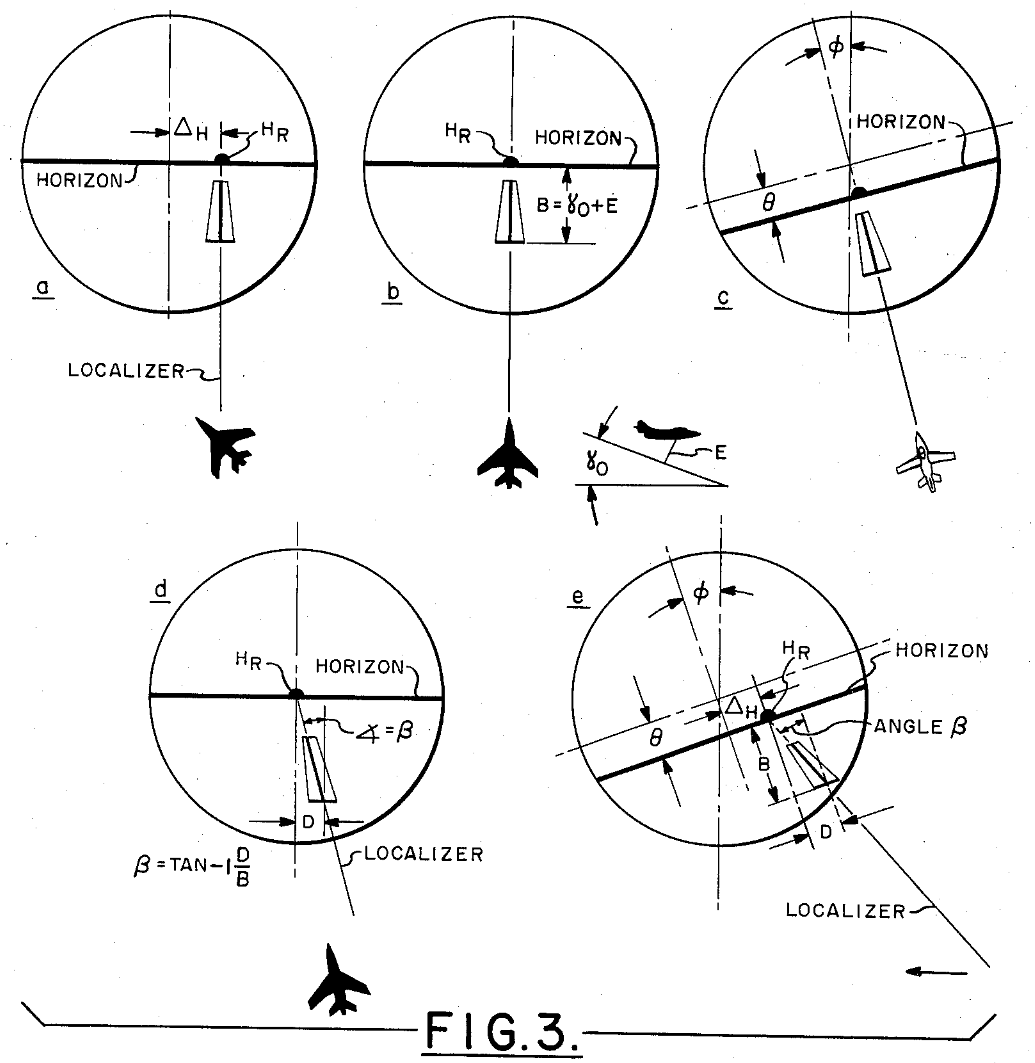
Figure 8:
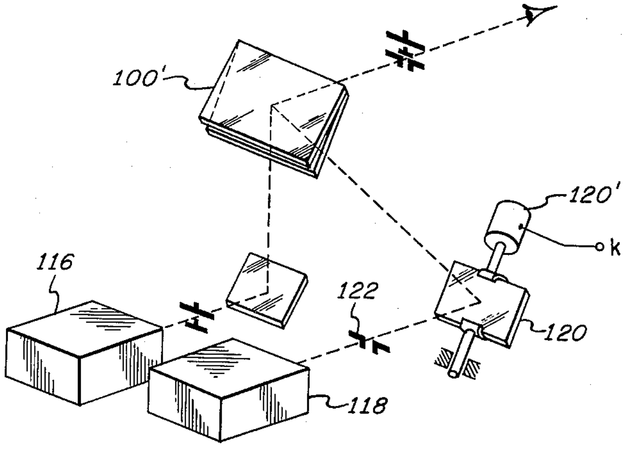
Figure 4A:
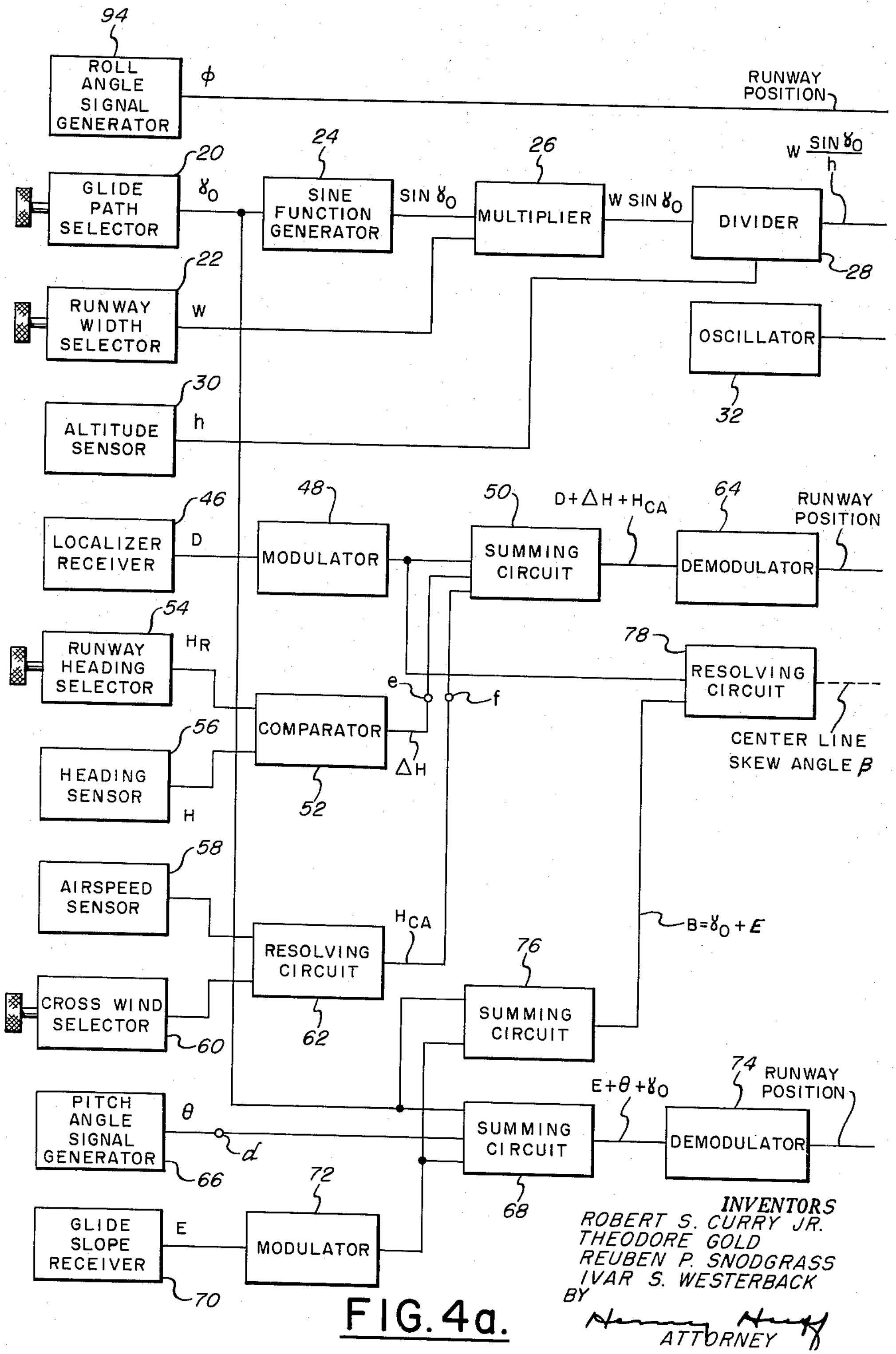
Figure 4B:
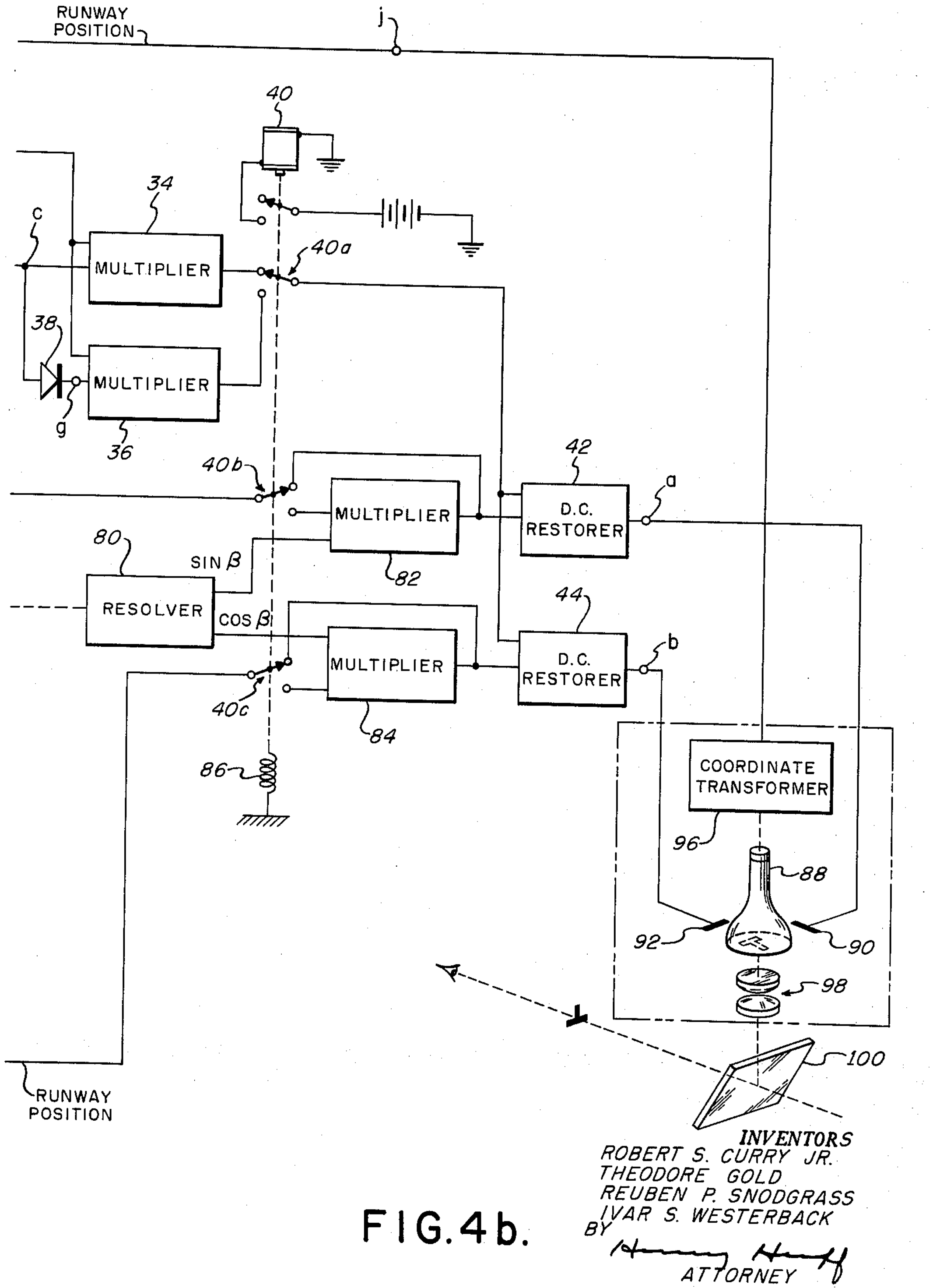
Figure 7:
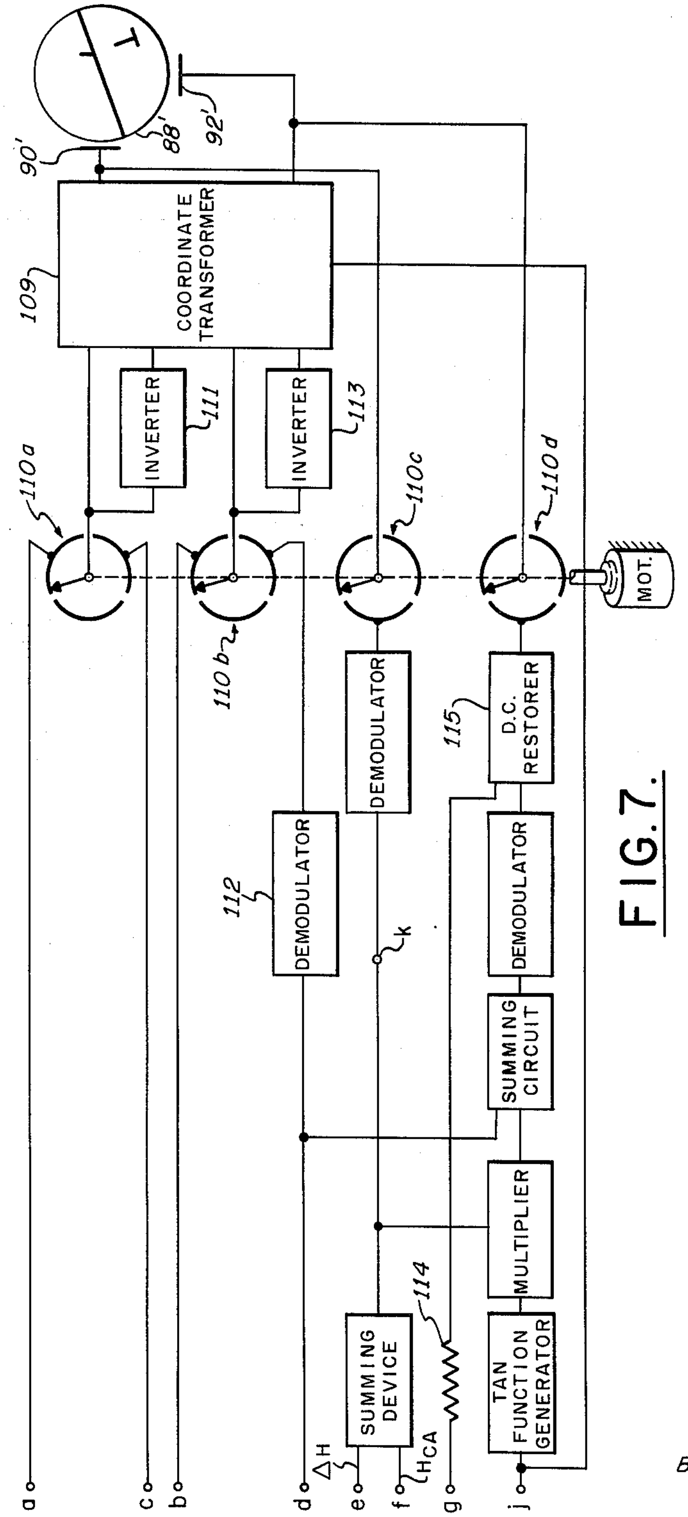
Figure 6:
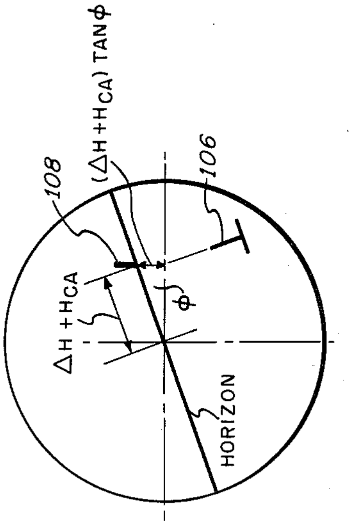
Figure 5:
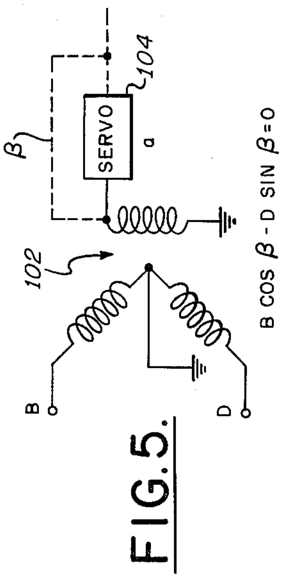

The invention will be described with reference to a representative embodiment thereof as illustrated in the accompanying drawings wherein:

FIG. 1 diagrammatically illustrates an embodiment of the basic concept of the present invention, FIG. 2 is a diagram showing how an aircraft runway appears to a pilot to change its position, size and shape during a landing maneuver, FIG. 3 is a series of diagrams useful in describing one form of apparatus embodying the invention, FIGS. 4*a* and 4*b* are block diagrams of an embodiment of the invention useful in landing an aircraft, FIG. 5 is a schematic diagram of a circuit which may be employed by the apparatus of FIG. 4, FIG. 6 is a diagram useful in describing another form of the invention, FIG. 7 shows a circuit which, when substituted for part of the apparatus of FIGS. 4*a* and 4*b*, provides the form of the invention endeavored to be taught by the diagram of FIG. 6, and FIG. 8 is a schematic presentation in block form of a presently preferred form of the invention.

As inferred earlier, two bundles of parallel light rays, each having the same cross sectional area and containing rays which under normal visual conditions combine to form a resultant image of two images, one image being the real world object image and the other being a locally generated image corresponding to the real world object image. The locally generated image is focussed at optical infinity, while the actual real world image is for all practical purposes located at optical infinity. As the viewer moves relative to the real world object the images within respective bundles similarly change size and shape simultaneously. By way of example, FIG. 1 shows two bundles of light rays 10 and 12 being transmitted to the eye of a viewer by means of a combining glass 14. The combining glass 14 may be a sheet of transparent reflective material so tilted as to assure that the bundle 12 transmitted by reflection to the viewer (the bundle 10 being transmitted by conduction through the glass 14). A collimating lens 16 forms the bundle 12 and serves to define the bundle 10 so that the two bundles have the same cross sectional area 15 as the bundle 12. An image E, produced by an image generator 18 (one form of which will be described later), appears to the viewer to be positioned at optical infinity by virtue of the collimation afforded by the lens 16. The image E provided by the generator 18 has the same size and shape as an actual image E formed from rays originating in the real world, i.e. contained within the bundle 10. Since the image E formed by the bundle 12 rays is locally generated and hence ever present, the viewer is assured of seeing "E" even though the real world "E" is not actually visible.

FIG. 2 shows how a specific object such as an aircraft runway in the field of view of a pilot, changes appearance during a visual landing approach maneuver. With the craft at position A, far out to the left of the localizer path, above the glide path, and in substantially level flight, the runway appears small depressed and off to the right in the view of the pilot. At position B, the craft is closer and the runway therefore appears larger and is more toward the center of his view. When the craft is at position C, the runway image appears to the left of center even though it is on the localizer beam because the craft is crossing the localizer on a heading greater than the beam bearing. From position D on, the runway image remains positionally fixed, but grows in size (due to decreasing range) as the craft nears the touchdown point.

FIGS. 3*a* through 3*e* are provided to show how a locally generated runway image may be made to change its shape within a locally generated bundle of light rays and thereby maintain the locally generated image superimposed on the actual runway image. These figures are also used pictorially to define the various angles and dimensions employed in the generation of the local image. FIG. 3*a* shows the runway image positioned within the field of view of the pilot (or locally generated bundle) but to the right of the center of the field of view by an amount ($\Delta H$), this distance being proportional to the angular difference between the actual craft heading and the runway heading or bearing $H_R$. FIG. 3*b* shows the runway image depressed within the pilot field of view by an angle proportional to the craft flight path angle to the runway, i.e. the glide slope angle $\gamma_0$ plus the craft displacement E from the glide slope. FIG. 3*c* shows the effect of craft pitch attitude ($\theta$) and roll attitude ($\phi$) on the pilot field of view, i.e. pitching of the aircraft moves the runway and horizon images up and down within the view whereas roll rotates them about the longitudinal axis of the view, which axis, for all intents and purposes, corresponds to the aircraft fore and aft axis. FIG. 3*d* shows that the runway image is positioned laterally by an amount proportional to the localizer displacement error D (in this view the craft has the same heading as the bearing of the runway) and due to perspective, the runway centerline appears skewed by an angle $\beta$. FIG. 3*e* shows the pilot field of view in which the various angles and distances have finite values, such as during a climbing turn to the right with the craft to the left of the localizer, just above the glide path and heading away from the localizer, as illustrated by the arrow.

To appreciate readily what is being taught by FIGS. 3*a* through 3*e*, it is suggested that the reader place a small rectangular sheet of paper on the floor in front of him and accordingly change his position with respect to it, noting at all times the position and apparent shape of the paper within his view.

The apparatus of FIGS. 4*a* and 4*b* illustrated in block diagram form provides a locally generated runway image overlay according to the teachings of the present invention in the manner illustrated graphically in FIGS. 3*a* through 3*e*. The apparatus includes a glide path selector 20, e.g. a potentiometer, which may be set to provide a signal proportional to the glide slope angle $\gamma_0$ for a particular ILS installation. A runway width selector 22, which may be a potentiometer also, provides a signal W proportional to the width of the particular runway threshold to which the aircraft is approaching. The glide path selector output signal $\gamma_0$ is applied to a sine function generator 24, e.g. a shaped potentiometer of the type shown and described on page 333 of Electronic Analog Computers, Korn and Korn, McGraw-Hill Book Co., New York, New York, which applies its output signal sin $\gamma_0$ to a multiplier 26, the multiplier 26 receiving also the signal W. The multiplier output signal $W \sin \gamma_0$ is applied to a divider 28 which receives a divisor signal $h$ from an altitude sensor 30. The divider 28 then provides a signal $$W\left(\frac{\sin \gamma_0}{h}\right)$$

the portion $$\left(\frac{\sin \gamma_0}{h}\right)$$

of the divider output signal being representative of the craft slant range to the runway threshold. In other words, the dimension W of the projected runway threshold is caused to vary directly in accordance with the sine of the predetermined approach angle and inversely in accordance with altitude.

An oscillator 32 applies its output signal to multipliers 34 and 36, the multiplier 36 receiving the oscillator signal through a rectifier 38, the function of which is to generate a signal representative of the centerline of the locally generated runway image. The multipliers 34 and 36 may be amplifiers, each of which is biased by the signal $$W\left(\frac{\sin \gamma_0}{h}\right)$$

The output signals of the multipliers 34 and 36 are applied to upper and lower contacts respectively of a switch 40*a*, the movable arm of which is connected to D.C. restorers 42 and 44. It will be understood that for simplicity the runway centerline dimension is made a function of W, $\gamma_0$ and $h$. For further accuracy the actual dimension of the runway centerline L could be inserted by means similar to the means for producing W.

A signal D, representing the craft displacement from the center of the localizer beam pattern, is provided by a receiver 46, modulated by a modulator 48, and applied to a summing circuit 50. The summing circuit 50 also receives a signal $\Delta H$ from a comparator 52 adapted to compare a signal H (representing the actual craft heading) and a signal $H_R$ (representing the heading or bearing of the runway centerline). The signal $H_R$ is provided by a runway heading or course selector 54, e.g. a synchro set by the pilot, the signal H being provided by a heading sensor 56, e.g. a compass system. In addition to the signals D and $\Delta H$, the summing circuit 50 receives a signal $H_{CA}$ representing the craft crab angle necessary to maintain craft on the localizer beam under cross wind conditions. Such a signal is derived from a suitable cross wind computer whose output is directly proportional to crab angle. The latter computer may comprise an air speed sensor 58 and a cross wind selector 60. The signals provided by elements 58 and 60 representing wind speed vectors and these signals are applied to a suitable resolving circuit 62 (one form of which will be described later with reference to FIG. 5) to provide the desired crab angle compensation signal $H_{CA}$. The summing circuit 50 output signal is demodulated by a demodulator 64 and applied to the D.C. restorer 42 when a switch 40*b* is in its upper position.

A pitch angle signal generator 66, e.g. a pitch axis pick-off on a vertical gyro, applies a signal $\theta$ to a summing circuit 68; a glide slope receiver 70 applies a glide slope displacement signal E to a modulator 72, the output of which is applied also to the summing circuit 68, in addition, the summing circuit 68 receives the signal $\gamma_0$. The output signal from the summing circuit 68 is demodulated by a demodulator 74 and applied to the D.C. restorer 44 when a switch 40*c* is in its upper position.

A summing circuit 76 receiving the signals $\gamma_0$ and E provides an output signal B equal to the algebraic sum of its input signals. The signal B is applied, along with the signal D, to a resolving circuit 78 (a form of which will be described later with reference to FIG. 5), the output shaft of which is rotated through the runway centerline skew or perspective angle $\beta$; such output shaft is connected to the rotor of a resolver 80 which provides signal outputs representing sin $\beta$ and cos $\beta$ respectively. The signals sin $\beta$ and cos $\beta$ are applied respectively to multipliers 82 and 84. The output signal from the demodulator 64 is applied to the multiplier 82 when the switch 40*b* is in its lower position; the output signal from the demodulator 74 is applied to the multiplier 84 when the switch 40*c* is in its lower position. The multipliers 82 and 84 have their output signals applied to the D.C. restorers 42 and 44 respectively.

The switches 40*a*, 40*b* and 40*c* are periodically moved up and down by the action of a suitable vibration device such as a relay 40 and a spring 86.

A cathode ray tube 88 having horizontal and vertical deflection plates 90 and 92 respectively (only one for each axis being shown for simplicity of illustration) is adapted to produce on its face the images of a runway threshold and its centerline. This locally generated image thus represents the threshold and centerline of the actual runway which in reality are identified by means of white markings and/or lights. The horizontal deflection plate 90 receives the output signal from the D.C. restorer 42 and the vertical deflection plate 92 receives the output signal from the D.C. restorer 44. A roll angle signal generator 94, e.g. a roll axis pick-off on a vertical gyro, applies a signal $\phi$ to a coordinate transformer 96 which, in this form of the invention, is a motor that provides relative rotation between the cathode ray tube and its deflection plates about an axis through the center of the tube face. If desired, such coordinate transformation may be accomplished electrically by the apparatus shown on page 331, Electronic Analog Computers, Korn and Korn. In a further alternative construction, the deflection means for the C.R.T. may be electromagnetic rather than electrostatic and the rotation of the C.R.T. images in accordance with roll attitude may be accomplished by rotation of the deflection coils about the neck of the tube.

The operation of the apparatus of FIG. 4 will be described by (1) showing how the locally generated runway image is generated, (2) showing how it is varied in size, (3) showing how it is positioned on the tube 88 face, and (4) showing how its shape is varied.

IMAGE GENERATION (*Assuming an on course approach*)

The runway threshold image is produced by applying the oscillator 32 output signal to the horizontal deflection plate 90 of the cathode ray tube 88. This occurs when the switches 40$a$, 40$b$ and 40$c$ are in their respective upper positions. The runway centerline image is provided by applying a rectified sine wave signal to the cathode ray tube vertical deflection plate 92. This occurs when the switches 40$a$, 40$b$ and 40$c$ are respectively in their lower positions. Since the switches 40$a$, 40$b$ and 40$c$ periodically move up and down, it is essential that the oscillator 32 output signal have a frequency substantially greater than the switching frequency. In this way, several sweeps of the cathode ray tube beam across the face of the tube 88 will occur during the times that the switches are in their respective upper and lower positions. In practice the oscillator frequency, switching frequency and tube phosphor persistence are so matched that both the threshold and centerline images are viewable simultaneously.

IMAGE SIZE

The locally generated runway image size varies as an inverse function of craft slant range to the runway. Accordingly, the image generating signals, i.e. the sweep signals derived from the oscillator 32, have their amplitudes varied as functions of the slant range signal $$\left(\frac{\sin \gamma_0}{h}\right)$$

by multiplying them thereby. With the craft on course and substantially on the glide slope at a low altitude (which means the aircraft is nearing the runway), the signal $$\left(\frac{\sin \gamma_0}{h}\right)$$

has a substantial value and so too are the output sweep signals from the multipliers 34 and 36. The resultant threshold trace will be relatively long thereby keeping its dimensions the same as the actual threshold image. With the craft on course substantially on the glide slope and the altitude considerable (which means the aircraft is far from the threshold), the signal $$\left(\frac{\sin \gamma_0}{h}\right)$$

has a minimal value, as are the output sweep signals from the multipliers. The resultant threshold trace will likewise be quite short so that it will coincide in dimension with the actual threshold image dimension (see FIG. 2$a$).

IMAGE POSITION (*Assuming zero roll attitude*)

Both the locally generated runway threshold and centerline images are positioned in the pilot's field of view in accordance with the position therein of the actual runway image by providing, through D.C. restoration, the sweep signals with D.C. components proportional to displacement components representing the lateral and vertical displacements of the actual runway with respect to the position of the aircraft. That is, the runway image is positioned laterally on the tube face in proportion to the biasing D.C. component $D+\Delta H+H_{CA}$ (as illustrated in Diagrams 3$a$ and 3$d$); similarly the runway image is positioned vertically on the tube face in proportion to the biasing D.C. component $E+\theta+\gamma_0$ (as illustrated in Diagrams 3$b$ and 3$d$). By this means, the locally generated runway image elements are positioned in the pilot's field of view in accordance with the position of corresponding actual runway image elements relative to the aircraft.

RUNWAY SHAPE

The shape of the locally generated runway image is made to vary in accordance with the shape of the actual runway image (perspective to the center-of-vision on the horizon) by skewing the runway centerline image in proportion to the perspective angle $\beta$ (see FIGS. 3$d$ and 3$e$). To generate a signal proportional to the angle $\beta$, reference should be had to FIG. 5. In this figure the signal B, i.e. $\gamma_0+\theta$, and the signal D are applied to a resolver 102, the rotor of which applies its induced signal to a servo 104 which drives the rotor in follow-up to cancel such signal. When complete cancellation occurs, the rotor is positioned relative to its reference position by the angle $\beta$ (and the equation of FIG. 5 is satisfied). With the angle $\beta$ determined, the centerline, of the runway image is skewed in proportion thereto by lateral D.C. component of the vertical centerline sweep signal as a function of sin $\beta$ and varying the vertical D.C. component of the vertical centerline sweep signal as a function of cos $\beta$. In this way, no sideways tilting of the centerline image will occur when the angle $\beta$ is zero, i.e. when sin $\beta$ is zero. It will be noted that through the use of multipliers 82 and 84 and the arrangement of time share switches 40$b$ and 40$c$, it is only the center line sweep that is skewed in proportion to the center-of-vision perspective angle $\beta$. However, it will be understood that the threshold sweep may likewise be skewed in a similar manner in accordance with lateral vanishing point perspective changes.

The diagram of FIG. 6 shows the images produced by a modified form of the present invention, i.e. FIG. 6 shows a runway image 106 in the same view as an image of the horizon and a heading marker image 108. To produce the horizon and heading marker images, the apparatus of FIG. 7 is substituted for the apparatus contained within the dashed lines of FIG. 4. In so doing, the apparatus within the dashed lines of FIG. 4$b$ is disconnected from points $a$, $b$ and $j$ of FIG. 4$b$ and, instead, the appartus of FIG. 7 is connected to points $a$, $b$, $c$, $d$, $e$, $f$, $g$ and $j$ which will appear on the apparatus of FIGS. 4$a$ through 4$b$. With the apparatus of FIG. 7 so connected, the cathode ray tube 88 may be time-shared by a "horizon sweep" generator, a "heading marker sweep" generator and the runway image generating equipment.

In FIG. 7, the runway image is produced by the signals appearing at points $a$ and $b$ as heretofore described. These signals are applied to an electrical coordinate transformer 109 (which may be of the type mentioned earlier) when time-sharing switches 110$a$, 110$b$, 110$c$ and 110$d$ have their respective wipers positioned as shown. Inverters 111 and 113, e.g. amplifiers, serve merely to change the sign of their respective input signals as required by the coordinate transformer 109. When the wipers respectively move to their next clockwise switch segments, a bias signal proportional to the craft pitch attitude $\theta$, provided at the output of a demodulator 112, causes the horizon image (resulting from a horizontal sweep signal applied at point $c$) to move normally vertically on the face of the tube in proportion to the pitch attitude of the craft. The heading marker image 108 is provided by taking (when the switch wipers are on respective segments just counterclockwise of the segments upon which they are shown) the sweep signal appearing at point $g$, attenuating it by means of a resistor 114 (to reduce effectively the length of the sweep), and applying it to the vertical deflection plate 92'. The image so produced is moved normally laterally across the face of the tube in proportion to a D.C. bias signal component $(\Delta H+H_{CA})$, i.e. the heading of the craft relative to the bearing of the runway centerline, which is applied to the horizontal deflection plate 90'. It will be noted that the localizer displacement term is not present in this bias which is as it should be since at the center-of-vision all lines parallel to the runway centerline converge to a point. To assure that the heading marker image 108 is maintained on the horizon image at all times, the heading marker image 108 is positioned vertically on the tube face in proportion to a D.C. signal component proportional to $(\Delta H+H_{CA})$ tan $\phi$ (bank angle) as illustrated in FIG. 6, the latter signal being applied from a D.C. restorer 115 to vertical deflection plate 92'.

Referring to FIG. 8, which illustrates schematically a presently preferred form of the invention, the apparatus illustrated by block 116 comprises the apparatus disclosed in FIG. 7, which produces the locally generated images (in a first bundle of light rays) corresponding to actual real world images (in a second bundle of light rays). These images are combined with still another image (in a third bundle of light rays), the movement of which represents flight director or flight control commands, the latter image being referred to as a flight path marker and being formed and moved by the apparatus represented by the block 118. This latter apparatus is fully disclosed in copending U.S. application S.N. 54,400, now U.S. Patent No. 3,128,623, filed in the name of Theodore Gold, a co-inventor herein and assigned to the assignee of this application. Both the apparatus 116 and 118 direct their respective images to a combining glass 100' (like that shown in FIG. 8 of U.S. application S.N. 54,400) which then reflects the combined images to the eyes of the pilot. A mirror 120 is positionable to cause the flight path marker image 122 to move laterally across the combining glass 100' in accordance with deviations in the heading of the craft from the runway bearing and crab angle. This may be accomplished by means of a suitable follow-up servo 120' responsive to the voltage derived at point *k* in FIG. 7. This arrangement causes the flight path marker image to be maintained in the presence of lateral gusts and steady state cross winds. The image produced by the equipment 118 is preferably of greater intensity and of a different color than the runway image, thereby providing a 3-dimensional impression and allowing the pilot to distinguish readily one group of images from the other. Now, when the craft is flown such as to maintain the path marker image continually superimposed on the runway threshold image, a successful landing approach must be effected, under all visibility conditions heretofore referred to. Furthermore, inasmuch as the pilot is provided with flight control information as provided by the requirement that the pilot maintain the flight path marker superimposed on the runway threshold, which is his destination, and by the fact that the runway threshold image is always visible to him whether or not the pilot can see the actual runway, a minimum number of real world cues is all that is required for the pilot to perform successfully the approach and landing maneuver regardless of the visibility conditions.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An aircraft instrument system for supplying to a human pilot representation in whole or in part of a runway which will appear to the pilot looking through his windshield to be matched to the corresponding part of the actual runway on which the pilot's eyes are focused, said instrument system comprising means for creating at any and all times while in operation and irrespective of aircraft location with respect to an actual runway on the ground a cue image of prescribed configuration corresponding to at least some portion or portions of a runway, means for varying the size of said cue image in accordance with the distance from the aircraft to the runway being approached whereby to maintain a match in size during approach, means for varying the perspective appearance of said cue image in accordance with lateral departures of the aircraft from a selected approach path toward the runway on the ground, means for stabilizing said cue image in pitch, roll and azimuth, and means for collimating the light rays from said cue image and directing them to the eyes of the pilot including means for creating a virtual image of said cue image in the direct line of sight from the pilot's eyes to the runway on the ground whereby the cue image and the corresponding part of the actual runway are capable of being visually matched at optical infinity throughout an approach for a landing.

2. An instrument system according to claim 1 in which the cue image generating means includes a cathode ray tube on the face of which the said image is formed.

3. An instrument system according to claim 1 in which the means for varying the perspective appearance of the cue image includes radio receivers for glide slope and localizer signals.

4. An instrument system according to claim 1 in which the cue image comprises an inverted T-shaped figure in which the base line represents the threshold of the runway and the vertical line represents the center line of the runway.

5. An instrument system according to claim 1 further including means for creating a second cue optically distinguishable from said first mentioned cue image and adapted to represent the far end of a line of sight, means for positioning said second cue so as to represent the aircraft's flight path such that the position of said second cue upon a distant object or runway will represent point of impact, and means for combining said second cue with said first mentioned cue image such that both may be simultaneously viewed at optical infinity.

References Cited by the Examiner

UNITED STATES PATENTS

| | | | |
|---|---|---|---|
| 2,425,400 | 8/1947 | Schade | 88—57 |
| 2,426,184 | 8/1947 | Deloraine et al. | 343—118 |
| 2,448,023 | 8/1948 | Folland et al. | 343—100 |
| 2,453,122 | 11/1948 | Ensinger | 88—2.3 |
| 2,459,206 | 1/1949 | Wheeler | 88—2.3 |
| 2,517,779 | 8/1950 | Flint | 88—1 X |
| 2,643,374 | 6/1953 | Bartow | 343—108 |
| 2,872,840 | 2/1959 | Stanton | 88—1 |
| 2,887,927 | 5/1959 | Newton | 33—46.5 X |
| 3,005,185 | 10/1961 | Cumming et al. | |
| 3,059,519 | 10/1962 | Stanton | 88—1 |
| 3,164,830 | 1/1965 | Powley et al. | |

CHESTER L. JUSTUS, *Primary Examiner.*